United States Patent
Payan et al.

(10) Patent No.: US 9,122,256 B2
(45) Date of Patent: Sep. 1, 2015

(54) METHOD OF OPERATING A MOBILE CONTROL UNIT OF A HOME-AUTOMATION INSTALLATION

(75) Inventors: Pascal Payan, Marignier (FR); Florent Pellarin, Pringy (FR); Bernard Grehant, Nancy sur Cluses (FR)

(73) Assignee: SOMFY SAS, Cluses (FR)

( * ) Notice: Subject to any disclaimer, the term of this patent is extended or adjusted under 35 U.S.C. 154(b) by 48 days.

(21) Appl. No.: 13/881,876

(22) PCT Filed: Oct. 25, 2011

(86) PCT No.: PCT/EP2011/068634
§ 371 (c)(1),
(2), (4) Date: Apr. 26, 2013

(87) PCT Pub. No.: WO2012/055857
PCT Pub. Date: May 3, 2012

(65) Prior Publication Data
US 2013/0225132 A1 Aug. 29, 2013

(30) Foreign Application Priority Data

Oct. 26, 2010 (FR) ...................................... 10 58765

(51) Int. Cl.
*H04M 1/66* (2006.01)
*H04M 3/00* (2006.01)
(Continued)

(52) U.S. Cl.
CPC ................ *G05B 15/02* (2013.01); *G08C 17/02* (2013.01); *H04L 63/065* (2013.01)

(58) Field of Classification Search
CPC ........... G05B 15/02; G05B 2219/2642; G05B 19/0426; G05B 19/19; G05B 11/01; G05B 15/00; G05B 19/416; G05B 19/4166; G05B 2219/25056; G05B 2219/31241; G05B 2219/45015; H04L 12/2803; H04L 12/2818

USPC ............. 455/67.11, 404.2, 411, 456.1, 456.3, 455/457, 41.2, 420, 414.1, 421, 422.1, 466, 455/556.1, 557; 709/218, 223–224; 370/254, 216, 311, 338

See application file for complete search history.

(56) References Cited

U.S. PATENT DOCUMENTS

| | | |
|---|---|---|
| 6,535,107 B1 | 3/2003 | Bartz |
| 6,563,430 B1 | 5/2003 | Kemink et al. |

(Continued)

FOREIGN PATENT DOCUMENTS

| | | |
|---|---|---|
| DE | 10 2005 038 471 A | 2/2007 |
| DE | 10 2007 059 246 A | 7/2009 |

(Continued)

*Primary Examiner* — Inder Mehra
(74) *Attorney, Agent, or Firm* — Frommer, Lawrence & Haug LLP (57) ABSTRACT

Method of operating a mobile control unit intended to form part of a home-automation installation comprising elements including items of equipment fixed in a building, the elements of the installation communicating over a home-automation network, each element being furnished with an identifier which is specific to it and with an authentication key, termed "common key", identical for all the elements of the home-automation network and authenticating an element's membership to the home-automation network, characterized in that it comprises:—a step of locating the mobile control unit with respect to a contour containing the elements of the home-automation installation, the mobile unit comprising a means of network linking to the home-automation network,—a step of automatic invalidation of the common key contained in the mobile control unit in the case where the mobile control unit is situated outside the contour.

16 Claims, 4 Drawing Sheets

S41
If the mobile control unit RCU is outside the contour, then automatically change the common key in the set of appliances linked to the home-automation network, except for the mobile control unit RCU (51) Int. Cl.
*H04M 3/42* (2006.01)
*H04M 1/00* (2006.01)
*H04W 24/00* (2009.01)
*H04W 4/00* (2009.01)
*G05B 15/02* (2006.01)
*G08C 17/02* (2006.01)
*H04L 29/06* (2006.01)

(56) References Cited

U.S. PATENT DOCUMENTS

| | | | |
|---|---|---|---|
| 7,110,761 B2 | 9/2006 | Remes et al. | |
| 7,289,014 B2 | 10/2007 | Mullet et al. | |
| 7,363,028 B2 | 4/2008 | De Clerq et al. | |
| 7,516,039 B2 | 4/2009 | McKitterick | |
| 7,683,754 B2 | 3/2010 | Autret | |
| 7,724,687 B2 | 5/2010 | Autret et al. | |
| 2002/0031228 A1* | 3/2002 | Karkas et al. | 380/270 |
| 2004/0203592 A1* | 10/2004 | Kermode et al. | 455/411 |
| 2008/0238661 A1* | 10/2008 | Camp et al. | 340/539.21 |
| 2009/0080348 A1 | 3/2009 | Hamel et al. | |

FOREIGN PATENT DOCUMENTS

| | | | | |
|---|---|---|---|---|
| EP | 0 913 979 A2 | 5/1999 | | |
| EP | 0 973 126 A | 1/2000 | | |
| EP | 1 164 540 A | 12/2001 | | |
| EP | 1 482 718 A | 12/2004 | | |
| FR | 2 898 719 | * 9/2007 | ............ | G08C 17/02 |
| FR | 2898719 A | 9/2007 | | |
| FR | 2924890 A | 6/2009 | | |
| WO | WO 00/57375 A | 9/2000 | | |
| WO | WO 01/71685 A | 9/2001 | | |
| WO | WO 03/007266 A | 1/2003 | | |
| WO | WO 03/081352 A | 10/2003 | | |
| WO | WO 03/088486 A | 10/2003 | | |
| WO | WO 2005/048530 A | 5/2005 | | |
| WO | WO 2009/017984 A | 2/2009 | | |
| WO | WO/2009017984 | * 2/2009 | ............ | H04L 29/06 |
| WO | WO 2010/018538 A | 2/2010 | | |
| WO | WO 2010/049383 A | 5/2010 | | |

* cited by examiner

METHOD OF OPERATING A MOBILE CONTROL UNIT OF A HOME-AUTOMATION INSTALLATION

This application is a 371 of PCT/EP2011/068634 filed on Oct. 25, 2011, published on May 3, 2012 under publication number WO 2012/055857, which claims priority benefits from French Patent Application Number 10/58765 filed Oct. 26, 2010, the disclosure of which is incorporated herein by reference.

The invention relates to the field of the control of home-automation appliances fixed in a building or in its environs, such as motorized appliances for closure or solar protection, for heating and air-conditioning, for lighting or for private swimming pool management.

These home-automation appliances communicate with one another with the aid of a home-automation network of radiofrequency type or by carrier currents, and can communicate with remote servers.

The presence of closure appliances (doors, locks, flaps) poses a problem of security and of authentication, equally well during the configuration of an installation and during its operation, especially with the prospect of a recourse to mobile control elements carried out on the basis of commonplace communicating means such as personal digital assistants or mobile telephones such as smartphones.

During operation, the increasing number of home-automation appliances to be controlled makes it necessary moreover to implement simplified ergonomics for selecting the desired appliance, without however resorting to pop-up menus or choices of poorly identifiable icons. This need is all the more marked as an aging part of the population is confronted with problems of vision.

Patent application WO 03/007266 describes the control of a remote object with the aid of a pointer provided with a light source.

Patent application WO 03/088486 describes a near field evaluation method making it possible to ensure, when transmitting a pairing command, that a transmitter of this command is situated in immediate proximity to a receiver.

U.S. Pat. No. 7,724,687 envisages that a confidential datum such as a "house key" can only be transmitted from one commands transmitter to another commands transmitter if a commands receiver previously validates this transmission.

The patent application WO 03/081352 describes a method of change of common key while the patent U.S. Pat. No. 7,683,754 describes a method for selecting a group for the transmission of a common key, for example by using the power supply voltage of the only elements of the group.

Patent application WO 2010/049383 describes a portable unit capable of contactless near field communication with electronic tags disposed on home-automation appliances and/or in particular sites of a building, for example at the entrance of the rooms of an accommodation.

Patent applications EP 0 973 126 and EP 1 164 540 describe the use of the memory card SIM code of a mobile telephone, and optionally of a fingerprint reader of this mobile telephone, to securely control appliances. Likewise in respect of patent U.S. Pat. No. 6,535,107 which relates to the field of the identification of a vehicle driver. In this case, a transponder is inserted into the mobile telephone in order to allow data exchange with the security system of the vehicle.

In patent application EP 1 482 718, the transmitter intended to establish the communication with the element to be controlled is hooked up to the mobile telephone by the earphone jack plug or by coupling and uses a DTMF or analogous modulation to transmit the coded signals from the mobile telephone to the transmitter.

Patent EP 0 913 979 also describes the supplementing of a mobile telephone with an additional transmitter for the remote control of an object. A specific mode allows remote control without use of mobile radiocommunication and the SIM subscriber code of the card is used as the user authentication means. The cellular structure of the mobile communication network is used as possibility for controlling authentication.

Patent application US 2002/0031228 describes a mobile telephone able to communicate both with a public communication network of GSM type and, at short range, with Bluetooth devices, for example hotel room or rental vehicle locks. A connection between the mobile telephone and a remote server is ensured via the GSM network. The remote server transmits the Bluetooth authentication key to the mobile telephone, in encrypted form, decryptable by the mobile telephone. The Bluetooth authentication key is thereafter transmitted by the mobile telephone to the Bluetooth device by means of the Bluetooth transmitter. The user's personal identification code PIN can be used to make the transmission secure.

Patent application DE 10 2005038 471 similarly describes a mobile terminal communicating both on GSM network and on Bluetooth or similar, to allow access to rental vehicles. The user is identified with a password on the mobile terminal.

Patent application DE 10 2007 059 246 describes one and the same device, in the case of a garage door control.

Application WO 00/57375 describes an antitheft security system for domestic electrical appliances. Each time the appliance is powered up, it operates only on receipt of a release code, transmitted by a house controller through the electrical power supply or a local network. Any appliance moved from its authorized position, that is to say not receiving its release code from the house controller, ceases to operate. Provision is made that the house controller may itself be stolen at the same time as the domestic electrical appliance. To alleviate this drawback, the house controller comprises a means of localization for example by way of a cellular network or by GPS and it can transmit its position to a remote operational center, by using for example the Internet or GSM network. The house controller does not have any other function in an installation than to ensure the disabling or the re-enabling of the appliances in the case of their disconnection and reconnection on the electrical network.

Patent application WO 01/71685 describes a universal remote control and methods able to display on the screen of the remote control icons relating to the appliances within radio range of the remote control, and/or control interfaces of these appliances.

Patent application FR 2 924 890 describes a method for automatically selecting a peripheral such as a home-automation appliance using a proximity criterion: a message is broadcast to all the peripherals and each of them responds. As a function of the signal level received, the nearest peripheral is automatically pinpointed so as to dispatch a command to it.

U.S. Pat. No. 7,289,014 describes a system for controlling an access barrier such as a garage door or gate, especially as a function of the position and/or of the direction of motion of a vehicle in the vicinity of the access barrier. It is envisaged (FIG. 9) that particular positions of a transponder or "proximity device" can be trained with the aid of a GPS satellite localization system, in such a way that the control system causes a predetermined action when the "proximity device" regains such a position, after training. For example, if the proximity device is in a so-called action position, then an action on a button causes an opening command, this not being the case outside of this action position.

U.S. Pat. No. 6,563,430 describes a remote control device whose user control interface depends on the location of the control device, inside a house for example. Numerous location schemes are described.

U.S. Pat. No. 7,363,028 also describes this type of control device and especially a scheme for radiofrequency identification of the appliance nearest to the control device, by progressive decay of the transmission power. This device is used to control various HiFi appliances in a room.

U.S. Pat. No. 7,110,761 describes the use of a directional pointing device to establish a wireless connection between the pointing device and another device, targeted by the directional pointing device.

In these last three documents, no reference is made to a common key making it possible especially to secure a function of access in the building.

The aim of the invention is to provide a method of operating a mobile control unit remedying the drawbacks mentioned previously and improving the methods known from the prior art. In particular, the invention proposes a secure operating method in which it is possible to configure and control in a simple and user-friendly manner by virtue of a mobile control unit, such as a mobile telephone, various appliances of an installation, while avoiding the consequences of a loss or of a theft of the mobile control unit when the latter is used as an installation tool.

According to the invention, the method governs the operation of a mobile control unit intended to form part of a home-automation installation comprising elements including appliances fixed in a building, the elements of the installation communicating on a home-automation network, each element being provided with its own specific identifier and with an authentication key, termed a "common key", identical for all the elements of the home-automation network and authenticating an element's membership of the home-automation network. The method comprises:

a step of locating the mobile control unit with respect to a contour containing the elements of the home-automation installation, the mobile unit comprising a means for network linking to the home-automation network, a step of automatically invalidating the common key contained in the mobile control unit in the case where the mobile control unit is situated outside the contour.

The contour can be defined by geolocation, the mobile control unit comprising a localization means delivering a position information.

The position information can be defined by a spatial mesh able to differentiate the respective positions of two elements of the home-automation installation.

The contour is defined by an envelope of the limits of radio communication between the mobile control unit and each appliance.

The method can comprise a step of broadcasting a response request message by the mobile control unit and a step of transmitting a response message by each appliance that received the first message.

One of the transmission steps can be carried out at reduced power.

The invalidation step can comprise the erasure of the common key and/or a blocking of the use of the common key contained in the mobile control unit.

The invalidation step can comprise a change of the common key contained in all the elements, with the exception of the mobile control unit.

The invalidation step can be activated if the user of the mobile control unit has been identified as a particular user of a first type and/or is not activated if the user of the mobile control unit has been identified as a particular user of a second type.

Identification as a particular user can result from at least one of the following events:
receipt of a particular command by the mobile control unit,
transmission of a particular command by the mobile control unit.

According to the invention, the means for linking to a home-automation network, comprising at least one common key memory and able to communicate on a home automation network with the aid of messages authenticated by virtue of the common key, comprises a means for automatically invalidating the common key.

When it is activated, the invalidating means can inhibit the common key when no response signal is received in response to a network appliances interrogation message, transmitted by the linking means.

The linking means can comprise means for connecting to a mobile telephone.

According to the invention, the mobile control unit comprises a linking means defined above and hardware and/or software means for implementing the above-defined operating method.

According to the invention, the installation comprises a mobile control unit defined above.

The invention also pertains to a computer program comprising a computer program code means suitable for carrying out the steps of the above-defined method, when the program is executed on a computer.

Figure 1:
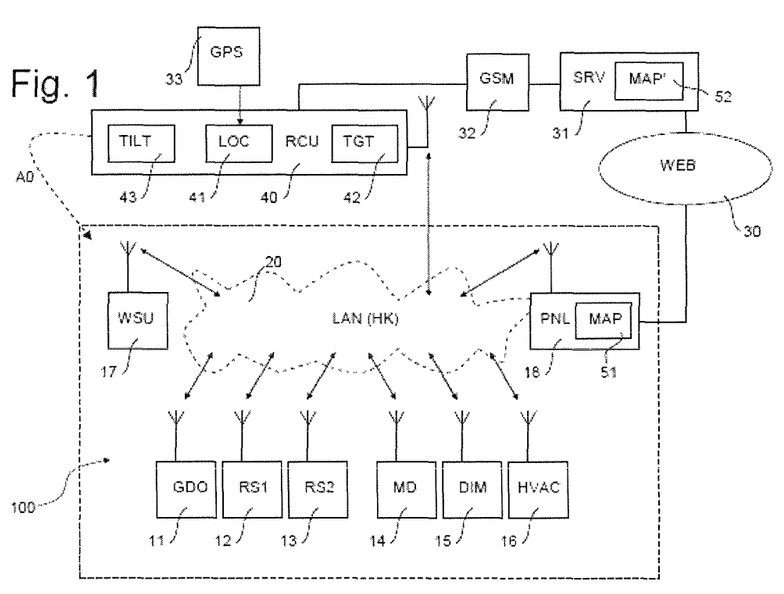
FIG. 1 represents in the form of a functional diagram a home-automation installation and a mobile control unit according to the invention.

The invention will be better understood on reading the description which follows, given solely by way of example while referring to the appended drawings in which:

FIG. 1 represents in the form of a functional diagram a home-automation installation 100 and a mobile control unit 40 according to the invention. The figure also represents the links of the home-automation installation and of the mobile control unit with the environment.

The home-automation installation comprises appliances. Certain appliances are of actuator type and comprise in particular one or more electric actuators, especially actuators for maneuvering mobile elements such as a mobile element for closure, solar protection or shading. Other appliances are of sensor type or of control box type. Thus, in the example of FIG. 1, the installation comprises:
- a first appliance 11 of actuator type for a garage door,
- a second appliance 12 of actuator type for a roller blind,
- a third appliance 13 also of actuator type for a roller blind,
- a fourth appliance 14 of actuator type for an electric lock for a main door,
- a fifth appliance 15 of dimmer actuator type for a variable-intensity lighting device.
- a sixth appliance 16 of heating/air-conditioning actuator type,
- a seventh appliance 17 of control box and sensor type, in the form of a wall switch,
- an eighth appliance 18 of control box and sensor type including a display screen, a tactile control interface and including for example a temperature probe.

Of course, the installation can comprise a much higher number of control boxes and/or sensors and can comprise other appliances in addition to or instead of the above-listed appliances, especially actuator type appliances for terrace awning, water treatment, ventilation, etc., including of domestic type such as a washing machine, a television etc. The invention applies, however, preferably to appliances occupying a fixed place in the building.

All the appliances communicate with one another on one and the same home-automation network 20, of local type (LAN) and using a common protocol, for example io-homecontrol, EIB, Zigbee etc. (trademarks). Preferably, the home-automation network is of radiofrequency type, this being represented by bidirectional arrows and an antenna symbol on each appliance. Alternatively, several local networks of different protocol and/or media are used to form the home-automation network 20. The appliances therefore each comprise a means for network linking to the home-automation network 20.

All the appliances share a common key, termed a house key HK. This key is for example a word of 64 or 128 bits, accommodated in a memory of each appliance and an authentication algorithm using the common key is used to allow an appliance to recognize that a control command or an arbitrary message has indeed come from another appliance of the installation.

Hereinafter, for simplicity, a message will be said to "contain the common key" or "comprise the common key" when its transmitter is authenticated by the common key. In practice, this authentication is carried out by dialog between the transmitter of the message and its recipient, or is carried out by encryption of the content of the message with the aid of the common key, or else requires both dialog and encryption of the content of the message. The common key is therefore not contained, as such, in the messages.

The eighth appliance 18 can be connected to a shared network 30 of Internet type by a gateway, not represented. A remote server 31 can also be connected to the shared network, thus permitting communication between the eighth appliance and the remote server.

A mobile control unit 40 comprises a means for network linking to the home-automation network 20, this network linking means also being represented by the symbol of an antenna and a double arrow. This linking means allows communication between the mobile control unit and any of the appliances of the home-automation network.

The mobile control unit comprises a localization means 41 making it possible to determine the position of the mobile control unit. It can moreover be linked to the server 31 by a long-distance communication network 32, for example of communication network type for GSM mobile telephones. The localization means 41 preferably uses an external resource 33, for example geolocation satellites of GPS or Galileo type providing signals.

Optionally, the mobile control unit can moreover be provided with a aiming means 42. Advantageously, the aiming means comprises a telemetric means 44 able to provide an information regarding the distance between the mobile control unit and a target object aimed by the aiming means. The aiming means comprises for example a photographic objective of variable focal length with autofocus device, as described in FIG. 9.

The aiming means can comprise a means 43 for measuring the orientation of the mobile control unit, especially an inclination means, comprising for example an accelerometer, especially a 3D accelerometer.

The localization means can also comprise an accelerometer for establishing a part of a localization information. Advantageously, one and the same 3D accelerometer is used in the localization means, for measurements of displacement with respect to a reference point and in the orientation measurement means for measurements of orientation of the mobile control unit.

A mobile telephone equipped with the hardware means described hereinabove and with software means able to execute the methods described subsequently can advantageously serve as mobile control unit. The means for network linking to the home-automation network is for example accommodated in the SIM card of the telephone, or in the battery of the telephone, or it is linked to the telephone by a removable connection, such as a jack plug. The network linking means is detailed under the reference 45 in FIG. 10: it comprises, in permanent memory 46, the protocol PTL of the home-automation network and it comprises, in erasable memory 47, the common key HK, if the latter has been transmitted to the network linking means. For security reasons, the network linking means, functionally linked with the mobile control unit, is however a piece of hardware distinct from the telephone and can only be provided for example by a manufacturer of one of the appliances of the home-automation network. This distinctive character of the network linking means appears in the form of a bold line.

The mobile control unit becomes an element of the installation 100 as soon as it communicates with one of the appliances, which membership is symbolized by a dashed arrow A0. However, this installation membership of the mobile control unit may be only provisional, especially in the case where the mobile control unit is used as a configuration tool by an installer. Ultimately, the installation comprises a plurality of elements, namely the mobile control unit and the set of appliances described hereinabove, each appliance being an element of the installation. The elements are all of active type, that is to say they are able to transmit or to receive a control command, or else a measurement datum coming from a sensor.

Figure 2:
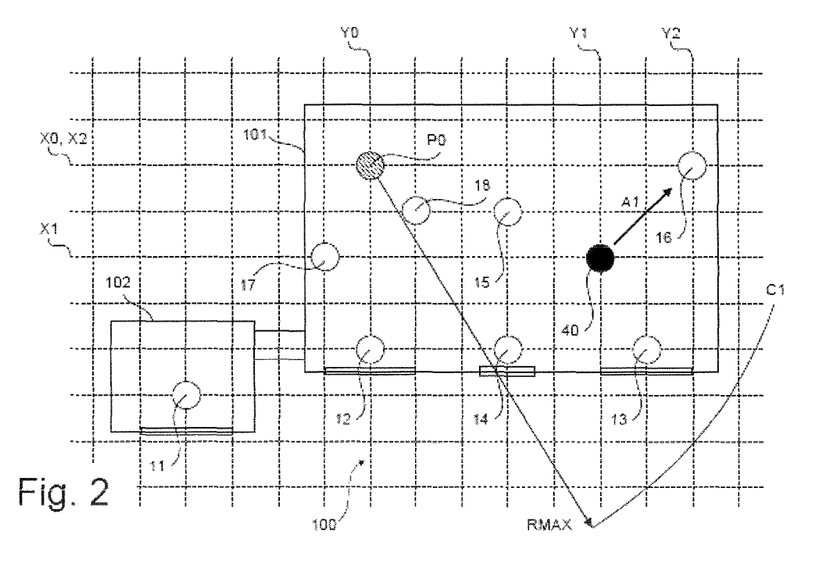
FIG. 2 spatially represents the home-automation installation and the mobile control unit.

FIG. 2 spatially represents a small building comprising the home-automation installation and the mobile control unit, according to an in-plane spatial mesh represented by two perpendicular networks of equidistant dashed lines, whose intersections are mesh nodes, pinpointed by two coordinates (X, Y). Alternatively, the spatial mesh advantageously comprises a third dimension (Z), and each node is pinpointed by three coordinates (X, Y, Z). The spatial mesh is able to differentiate the respective positions of two appliances of the home-automation network, that is to say that these two appliances exhibit different sets of coordinates. Each appliance is represented centered on the nearest node. The distance between two consecutive lines of the mesh (the spacing of the mesh) is therefore less than or equal to the minimum distance separating two appliances.

The spatial mesh must therefore be sufficiently precise, not only to be able to distinguish the current appliances of the installation but also to allow the future incorporation of new appliances. A much finer spatial mesh than that represented can be used, but then offering excess precision with respect to the need. Advantageously, the spatial mesh can be for example twice as precise, or indeed 10 times as precise, as that represented, with a view to the possible installation of other appliances in intermediate positions. A mesh spacing of 10 cm corresponds to a preferred value. FIG. 2, for which the mesh is substantially metric, is therefore not representative of a real mesh.

Alternatively, the mesh exhibits an auto-adaptive spacing, the spacing of the mesh being for example defined by passing progressively from a coarse mesh to a finer mesh depending on the existence or otherwise of a plurality of responses to an interrogation message, this message being transmitted with an increasingly low power as described in U.S. Pat. No. 7,363,028.

In the very simplified case of FIG. 2, the installation is distributed in a house main body 101 and in a garage 102 adjoining the main body. Partitions internal to the building are not represented. Bays relating to the garage door, to the main door and to the windows equipped with roller blinds are represented in triple line form.

The mobile control unit 40 is disposed in the installation, its position being pinpointed by coordinates X1 and Y1 in the spatial mesh. An arrow A1 indicates a direction aimed by the mobile control unit aiming means.

A particular position PO is pinpointed by coordinates X0 and Y0. Its role will be described subsequently.

The installation comprises hardware and/or software means making it possible to govern its operation in accordance with the method which is the subject of the invention. The software means can especially comprise a computer program code means suitable for carrying out the steps of the method according to the invention, when the program runs on a computer.

The control unit comprises hardware and/or software means making it possible to govern its operation in accordance with the method which is the subject of the invention. The software means can especially comprise a computer program code means suitable for carrying out the steps of the method according to the invention, when the program runs on a computer. The hardware means comprise a localization means making it possible to locate the mobile control unit with respect to a contour containing the elements of the home-automation installation and a means for automatically invalidating the common key contained in the mobile control unit, the invalidating means making it possible, in the case where the mobile control unit is situated outside the contour, to inhibit the common key.

A mode of execution of the operating method according to the invention is described hereinafter with reference to FIG. 3.

It is assumed in what follows that the mobile control unit is used by an installer who has come to configure the installation, or diagnose it, or supplement it.

In a first step S1, the mobile control unit is disposed in the building equipped with the home-automation installation of the appliances situated in the building and/or in the environs of the building.

Subsequent to a particular maneuver of the installer, a second step S2 is activated, in which the common key HK is transmitted to the mobile control unit.

This step can implement varied procedures. For example, the common key is contained in a confidential document communicated to the installer by the owner of the installation. It is then entered, in the form of alphanumeric characters, with the aid of a keypad of the mobile control unit. Alternatively, it is inscribed in barcode form on the confidential document and it is read by a photographic apparatus of the mobile control unit, also used in the aiming means. Alternatively, it is recorded in an electronic tag possessed by the owner and transmitted to the installer by the latter, the mobile control unit being able to read said electronic tag. Alternatively, it is transmitted via GSM by the remote server. Alternatively, it is transmitted, at reduced power, on the home-automation network by an appliance internal to the building and on which a particular manipulation has been carried out. Several of these alternatives can be combined to transmit all or part of the common key to the mobile control unit.

Preferably, the securing of the process comes from an encryption and an authentication procedure: for example a PIN code known only to the owner, or only to the installer, makes it possible to decrypt the common key.

The common key is then recorded in a memory of the mobile control unit, and preferably in a separate module RFU of this mobile control unit, which will be described in conjunction with FIG. 10, the decryption taking place in this separate module.

In a third step S3, the mobile control unit periodically verifies that it is in a geographical zone delimited by a contour C of the building, or, more broadly of a contour containing the elements of the home-automation installation.

The contour C is defined by a property of interaction between the mobile control unit and the installation. Two embodiments of this interaction property are specified in conjunction with FIGS. 4 and 5.

In a fourth step S4, the common key is automatically erased in the control unit if the third step has shown that the mobile control unit is outside the geographical zone, that is to say outside the contour. Advantageously, a timeout, for example of a few minutes, avoids untimely erasure in the case where the installer is engaged in a range test.

Thus, if the installer, provided with the mobile control unit, leaves the localities of the installation, there is erasure of the common key. The installation is therefore protected against the consequences of the loss or of the theft of the mobile control unit. This protection is moreover immediate or almost immediate.

Figures 3, 4:
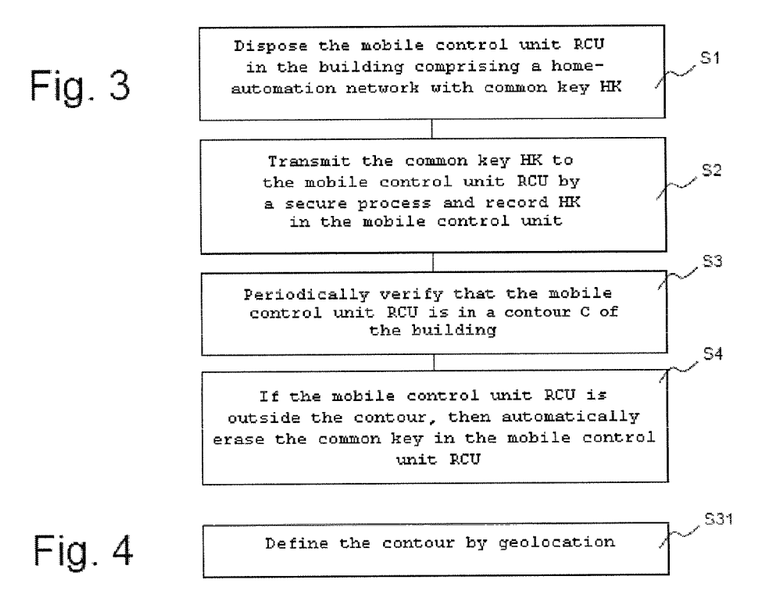
FIG. 3 is a flowchart of a mode of execution of an operating method according to the invention.
FIG. 4 is a flowchart of a first mode of execution of a step of locating the mode of execution of the operating method.

FIG. 4 represents a first embodiment of the third step of the control method, in the form of a first sub-step S31 included in the third step. This sub-step can also be prior to the first step. According to this first embodiment, the contour C is defined by geolocation.

These terms are understood to mean that the geographical position of the building and/or appliances, and at least the position of the mobile control unit is known in absolute value or in relative value.

Thus a position information is determined in the mobile control unit, with the aid of its localization means. If the mobile control unit is in the position of FIG. 2, the position information is for example the pair of coordinates X1, Y1.

The position information can be deduced from GPS geolocation data, corrected so as to obtain a sufficiently precise mesh but without excessive precision. A mesh spacing of 10 cm is for example preferred. If the GPS precision is too large, for example centimetric, then the last digit of coordinates is not taken into account in the position information. If the GPS precision is too low, for example metric, then the displacements measured by the accelerometer of the mobile control unit are taken into account in order to obtain a more precise localization, corresponding to the desired mesh. It is also possible to improve the GPS precision by analysis of the radio power received from the appliances. As specified above, the precision of the mesh can be adapted dynamically, according to the progressive addition of new appliances into the installation.

The displacements can be measured on the basis of a reference position, for example the particular position P0. In the absence of reception of GPS satellite signals, or to reduce the cost, any position information can be deduced simply from the displacements of the mobile control unit on the basis of the reference position.

The contour C can be defined for example in relation to the reference position P0. For example a first contour C1 is a circle of predefined radius RMAX centered about the reference position.

Advantageously, the contour is defined by geolocation on the basis of the knowledge of the positions of the appliances of the installation. For example, the specific appliance comprises a first cartographic memory 51 in which the position coordinates of each appliance of the installation have been stored (during a prior configuration step, or as the installer progresses through the configuration of the installation). In the step of defining the contour of the geographical zone, the localization of the appliances can be obtained by using the current position of the mobile control unit and a aiming information for each of the appliances, this aiming information comprising a information regarding orientation of the mobile control unit and a information regarding the distance between the appliance and the mobile control unit. This aiming information is obtained by virtue of the aiming means mentioned above. Alternatively, in a simplified manner, the localization of the appliances can be obtained by using the current position of the mobile control unit when the latter is disposed in proximity to the appliance.

Alternatively, the remote server is used to define the contour, the latter being able also to contain a second cartographic memory 52 containing the coordinates of the appliances of the installation.

In this case, the third step S3 can contain a sub-step consisting in dispatching the position information directly to the remote server, by using the GSM communication network, and in receiving a response therefrom regarding the presence or otherwise inside the contour C. Alternatively, the informations can still be transmitted to or received from the specific appliance, the latter communicating them to the remote server via the Internet network.

Contours defined by geolocation are described below in conjunction with FIGS. 7 and 8.

Figure 5:
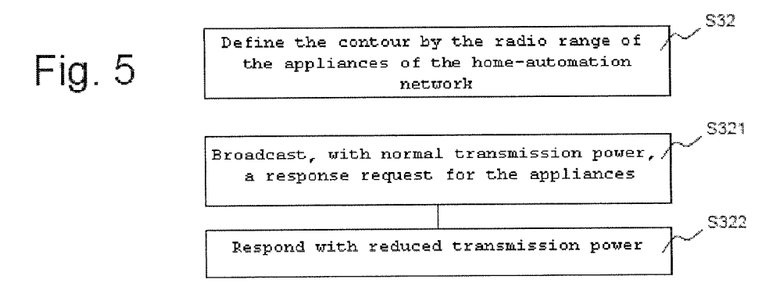
FIG. 5 is a flowchart of a second mode of execution of a step of locating the mode of execution of the operating method.

FIG. 5 represents a second embodiment of the third step of the control method, in the form of a second sub-step S32 included in the third step. This sub-step can also be prior to the first step. According to this first embodiment, the contour C is defined by the radio range of the home-automation appliances. For example, the contour C corresponds to the envelope of maximum range allowing communication between the mobile control unit and one or other of the appliances of the installation.

This maximum range may be high. Indeed, for appliances of good quality, the free-field range may be around 300 to 500 meters. Variants allowing this embodiment to be made more secure are described in conjunction with FIG. 9.

Figure 6:
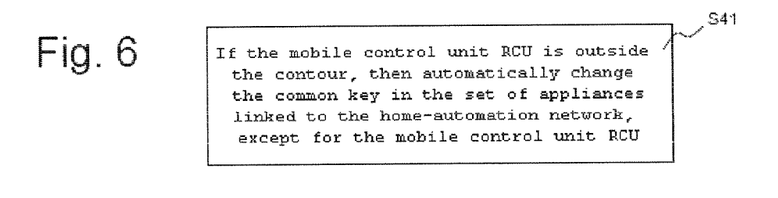
FIG. 6 is a flowchart of a variant of execution of a step of the mode of execution of the operating method.

FIG. 6 is a flowchart of a variant of execution of the invalidation step S4 of the mode of execution of the operating method. Designated by S41, this step replaces the fourth step S4. This time, in the case where the locating step has shown that the mobile control unit is situated outside the contour, the invalidation of the common key contained in the mobile control unit is caused by a change of the common key in the set of appliances except the mobile control unit RCU, for example as described in patent application WO 03/081352. This execution variant is more unwieldy to implement than invalidation of the common key actually within the mobile control unit, but it exhibits a higher level of security.

Figure 7:
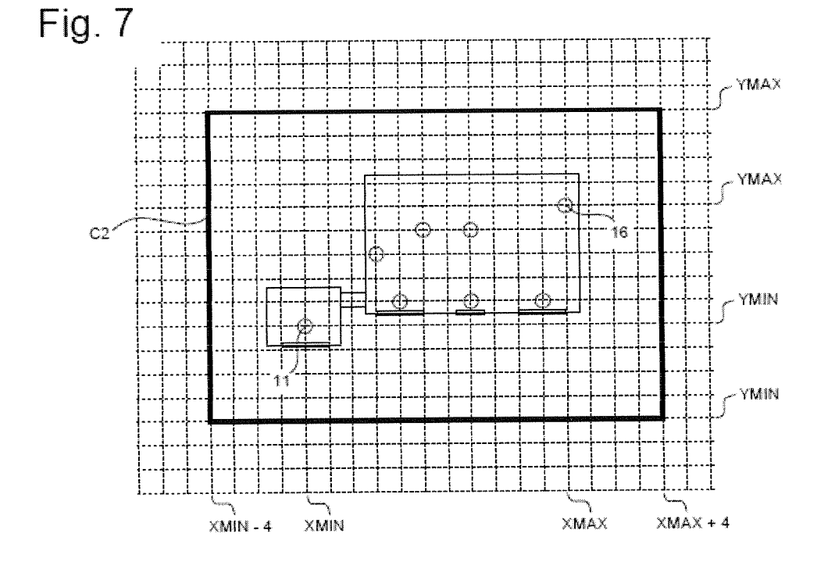
FIG. 7 represents a contour used in the first mode of execution.

FIG. 7 represents a second contour C2, used in the first embodiment.

In this example, the contour C2 is simply defined by the quadrilateral defined by the straight lines:

$$x=X\text{MIN}-4, x=X\text{MAX}+4$$

with the straight lines:

$$y=Y\text{MIN}-4, y=Y\text{MAX}+4$$

XMIN, XMAX, YMIN and YMAX representing the extremes of the coordinate values recorded in the cartographic memory (here the positions of the appliances referenced 11 and 16) and a value of 4 meters (or 4 units on the grid of the figure) being chosen as margin required by the on-site tests of the mobile control unit. Other values of margin, especially higher ones, are possible.

Figure 8:
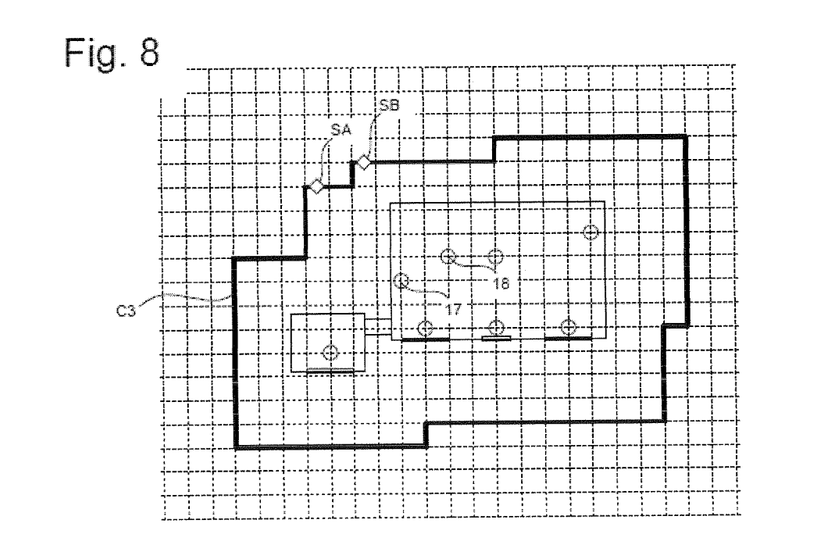
FIG. 8 represents another contour used in the first embodiment.

FIG. 8 represents a third contour C3, used in the first embodiment, in this example, each appliance is surrounded by a square (again of 4 grid units or 4 meters) and the contour C3 is the exterior contour of the set of these squares. For example, the point SA belongs to the square centered on the appliance 17 and the point SB belongs to the square centered on the appliance 18.

The secure implementation of the first embodiment preferably requires an interdependency of the linking means and of the localization device which are included in the mobile control unit, thereby requiring particular precautions if the latter comprises a mobile telephone including the localization means. On the other hand, this embodiment is particularly precise and applies to a fully integrated mobile control unit.

Figure 9:
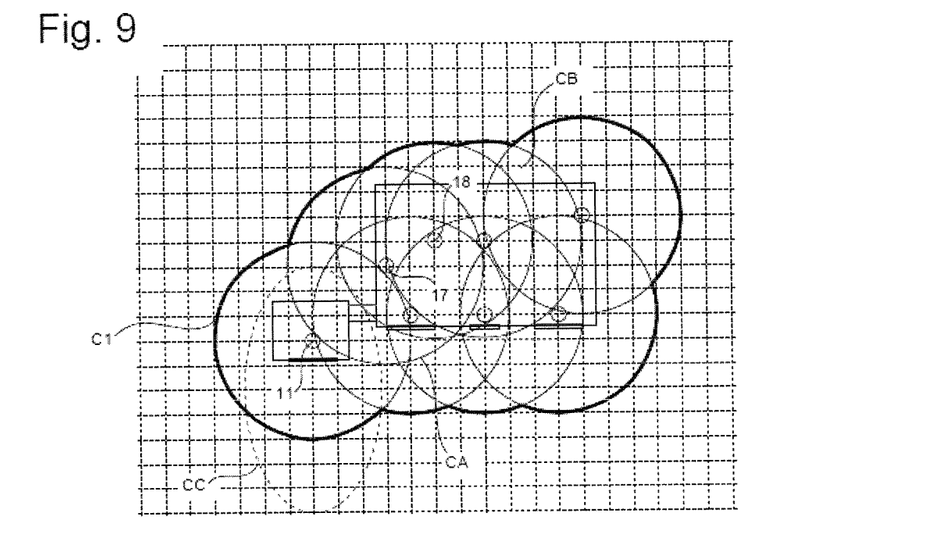
FIG. 9 represents a contour used in the second embodiment.

FIG. 9 represents a fourth contour C4, used in the second embodiment. This embodiment is easier to implement in a secure manner since it does not depend on a geolocation means. In FIG. 9, the geolocation grid appears only for comparison, but the coordinates of the appliances are not used.

In a first sub-step S321 of the second embodiment, the network linking means of the mobile control unit broadcasts on the home-automation network a response request message on the part of the appliances. This message is transmitted at normal power.

In a second sub-step S322 of the second embodiment, the appliances that received the previous message respond with a reduced power. For example, in FIG. 9, the effective range at reduced power becomes 4 meters. Any other value is possible, this value normally varies from one appliance to the other and does not need to be known precisely.

Alternatively, and more simply, the broadcast message is transmitted at reduced power during the first sub-step S321 and the response message is transmitted at normal power during the second sub-step S322.

Thus, the mobile control unit ceases to be within range of at least one of the appliances immediately upon leaving the fourth contour C4, formed by the envelope of circles of radius 4 meters centered on each of the appliances. For example the circle CA is centered on the appliance referenced 17 and the circle CB is centered on the appliance referenced 18.

Each circle corresponds to the locus of the limit points of communication between the appliance and the mobile control unit. When an appliance exhibits directionality, the circle is replaced with a radiation pattern of substantially elliptical type as represented by a dashed line under the reference CC for a radiation pattern of the reference appliance 11.

The range value is chosen sufficient for there to be overlap of the circles or radiation patterns and to obtain a single contour containing the set of appliances of the installation.

If the network linking means of the mobile control unit does not receive any response to the message broadcast during the first sub-step S322, then the mobile control unit RCU is outside the fourth contour C4, and there is automatic erasure (or more generally invalidation) of the common key.

In a variant of execution of the method according to the invention, the step of locating the mobile control unit with respect to the contour is carried out at the level of the mobile control unit.

Figure 10:
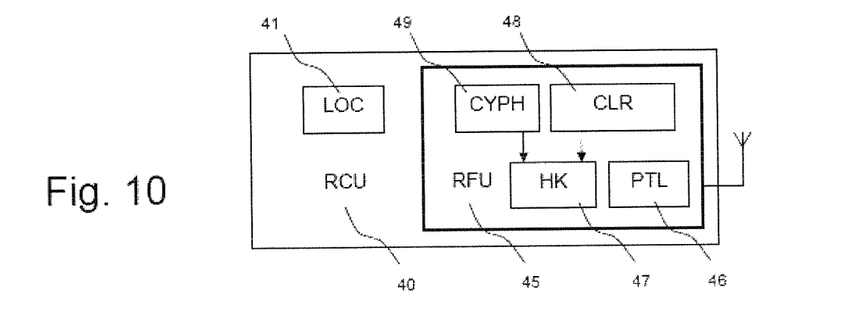
FIG. 10 partially represents the mobile control unit so as to illustrate embodiment details.

FIG. 10 partially represents the mobile control unit so as to illustrate embodiment details. As mentioned previously, the network linking means 45 is preferably embodied in the form of a device which is a separate piece of hardware but which can be integrated into a mobile telephone to constitute a mobile control unit 40. Thus, the network linking means benefits from all the interfaces, the mobile telephone and its resident or downloadable application programs. However, the network linking means contains in an independent manner, and not readable by programs of the mobile telephone, the plaintext common key HK in a common key memory 47 as well as all or part of the means 49 for decrypting a message containing the common key.

Thus, the common key is the example transmitted to the network linking means in encrypted form as indicated previously, but can only ultimately be decrypted inside the network linking means and is contained only in this network linking means.

The network linking means also comprises a means 48 for invalidating the common key. The expression invalidating means is understood to mean any hardware or software device either making it possible to automatically erase or to automatically modify the content of the common key memory, or making it possible to automatically inhibit the use of the common key by the network linking means.

The invalidating means may be activated by several successive failures to authenticate the user of the mobile control unit with the aid of a PIN code, after a power-up of the linking means.

The invalidating means is also activatable during the fourth step S4 of the control method.

The invalidating means may however remain inactive as long as a specific installer command has not been executed. A specific installer command is for example an actuators configuration command. Alternatively, the installer must authenticate himself as an installer via the GSM communication network with the remote server and the latter transmits the common key only after activation of the invalidating means.

Alternatively, only the owner of the installation may insert a PIN code (or a fingerprint or any biometric identification means) in order to validate a common key transfer or decoding. During this phase of validation by the owner, he can be asked whether the rights of use are permanent. If the response is positive, then the invalidating means will be deactivated.

It is thus possible to easily distinguish a user of a first type such as an installer, from a user of a second type such as the owner or those close to him, provided with permanent rights.

Thus, the invalidating means is never active, at least in the cases of execution of the fourth step S4, if the network linking means is associated with a user mobile telephone. A user having a mobile telephone associated with a network linking means according to the invention is therefore assured of being able to leave his residence and its environs while retaining the common key.

Conversely, if the mobile control unit is an installation tool, then the common key is automatically erased when the installer leaves the building or its environs.

The invention claimed is:

1. A method of operating a mobile control unit intended to form part of a home-automation installation comprising elements including appliances fixed in a building, the elements of the installation communicating on a home-automation network, each element being provided with its own specific identifier and with a common key for all the elements of the home-automation network and authenticating each element's membership of the home-automation network, the common key being an authentication key, wherein the method comprises:
a step of locating the mobile control unit with respect to a contour containing the elements of the home-automation installation, the mobile unit comprising a means for network linking to the home-automation network and the mobile unit including the common key,
a step of automatically invalidating the common key contained in the mobile control unit in the case where the mobile control unit is situated outside the contour.

2. The operating method as claimed in claim 1, wherein the contour is defined by geolocation, the mobile control unit comprising a localization means (LOC) delivering a position information.

3. The operating method as claimed in claim 2, wherein the position information is defined by a spatial mesh able to differentiate the respective positions of two elements of the home-automation installation.

4. The operating method as claimed in claim 1, wherein the contour is defined by an envelope of the limits of radio communication between the mobile control unit and each appliance.

5. The operating method as claimed in claim 4, wherein the method comprises a step of broadcasting a response request message by the mobile control unit and a step of transmitting a response message by each appliance that received the first message.

6. The operating method as claimed in claim 5, wherein one of the transmission steps is carried out at reduced power.

7. The operating method as claimed in claim 1, wherein the invalidation step comprises the erasure of the common key and/or a blocking of the use of the common key contained in the mobile control unit.

8. The operating method as claimed in claim 1, wherein the invalidation step comprises a change of the common key contained in all the elements, with the exception of the mobile control unit.

9. The operating method as claimed in claim 1, wherein the invalidation step is activated if the user of the mobile control unit has been identified as a particular user of a first type and/or is not activated if the user of the mobile control unit has been identified as a particular user of a second type.

10. The operating method as claimed in claim 9, wherein identification as a particular user results from at least one of the following events:
receipt of a particular command by the mobile control unit,
transmission of a particular command by the mobile control unit.

11. A means for linking to a home-automation network for a home-automation installation comprising elements including appliances fixed in a building, the elements of the installation communicating on the home-automation network, each element being provided with its own specific identifier and with a common key identical for all the elements of the home-automation network and authenticating an element's membership of the home-automation network, the common key being an authentication key, the linking means comprising at least one common key memory including the common key and able to communicate on a home-automation network with the aid of messages authenticated by virtue of the common key, wherein the means comprises a means for automatically invalidating the common key, wherein the linking device is configured to be integrated with a mobile device to form a mobile control unit comprising a means for network linking to the home-automation network and the mobile unit including the common key.

12. The linking means as claimed in claim 11, wherein, when it is activated, the invalidating means inhibits the common key when no response signal is received in response to a network appliances interrogation message, transmitted by the linking means.

13. The linking means as claimed in claim 11 wherein the linking means comprises means for connecting to the mobile device, wherein the mobile device includes a mobile telephone.

14. A mobile control unit comprising:
a linking means comprising memory including the common key and able to communicate on a home-automation network with the aid of messages authenticated by virtue of the common key, wherein the linking means comprises a means for automatically invalidating the common key, and non-transitory program memory for implementing, when executed by a processor, program instructions for an operating method comprising,
a step of locating the mobile control unit with respect to a contour containing the elements of the home-automation installation, the mobile unit comprising a means for network linking to the home-automation network and the mobile unit including the common key,
a step of automatically invalidating the common key contained in the mobile control unit in the case where the mobile control unit is situated outside the contour,
wherein the home-automation network is for a home-automation installation comprising elements including appliances fixed in a building, the elements of the installation communicating on the home-automation network, each element being provided with its own specific identifier and with the common key being identical for all the elements of the home-automation network and authenticating each element's membership of the home-automation network, the common key being an authentication key.

15. An installation comprising:
a mobile control unit comprising a linking means comprising at least one common key memory including the common key and able to communicate on a home-automation network with the aid of messages authenticated by virtue of the common key, wherein the means comprises a means for automatically invalidating the common key, and non-transitory program memory for implementing, when executed by a processor, program instructions for an operating method comprising,
a step of locating the mobile control unit with respect to a contour containing the elements of the home-automation installation, the mobile unit comprising a means for network linking to the home-automation network and the mobile unit including the common key,
a step of automatically invalidating the common key contained in the mobile control unit in the case where the mobile control unit is situated outside the contour; and
a plurality of elements including appliances fixed in a building, the elements of the installation communicating on the home-automation network, each element being provided with its own specific identifier and with the common key being identical for all the elements of the home-automation network and authenticating each element's membership of the home-automation network, the common key being an authentication key.

16. The linking means as claimed in claim 12, wherein the linking means comprises means for connecting to a mobile telephone.

* * * * *